US012659667B2

(12) United States Patent
Voishvillo

(10) Patent No.: US 12,659,667 B2
(45) Date of Patent: Jun. 16, 2026

(54) DUAL COMPRESSION DRIVER WITH SINGLE MAGNET

(71) Applicant: Harman Professional, Inc., Northridge, CA (US)

(72) Inventor: Alexander Voishvillo, Simi Valley, CA (US)

(73) Assignee: Harman Professional, Inc., Northridge, CA (US)

( * ) Notice: Subject to any disclaimer, the term of this patent is extended or adjusted under 35 U.S.C. 154(b) by 267 days.

(21) Appl. No.: 18/413,202

(22) Filed: Jan. 16, 2024

(65) Prior Publication Data

US 2025/0234134 A1 Jul. 17, 2025

(51) Int. Cl.
*H04R 7/02* (2006.01)
*H04R 1/24* (2006.01)
(Continued)

(52) U.S. Cl.
CPC ................ *H04R 7/02* (2013.01); *H04R 1/24* (2013.01); *H04R 9/02* (2013.01); *H04R 9/06* (2013.01);
(Continued)

(58) Field of Classification Search
CPC ... H04R 7/02; H04R 1/24; H04R 9/06; H04R 9/02; H04R 2201/34; H04R 2400/11; H04R 2400/13
See application file for complete search history.

(56) References Cited

U.S. PATENT DOCUMENTS 8,280,091 B2 10/2012 Voishvillo
8,831,270 B1 * 9/2014 Dimitrov ................ H04R 1/30 381/401
(Continued)

FOREIGN PATENT DOCUMENTS

| | | | |
|---|---|---|---|
| EP | 3644623 | A1 | 4/2020 |
| WO | 2017070481 | A1 | 4/2017 |
| WO | 2018038516 | A1 | 3/2018 |

OTHER PUBLICATIONS

Extended European Search Report for Application No. 24220852.8, dated Jun. 11, 2025, 7 pages.

*Primary Examiner* — Carolyn R Edwards
*Assistant Examiner* — Kuassi A Ganmavo
(74) *Attorney, Agent, or Firm* — Brooks Kushman P.C.

(57) ABSTRACT

A dual compression driver includes a first driver assembly having a first annular diaphragm disposed about a central axis and a first phasing plug disposed coaxially below the first annular diaphragm with a first plurality of apertures extending therethrough, and a second driver assembly having a second annular diaphragm disposed about the central axis and a second phasing plug disposed coaxially above the second annular diaphragm with a second plurality of apertures extending therethrough. A shared annular magnet is disposed between the first driver assembly and the second driver assembly. A back cover is mounted to the first phasing plug, and a front adapter is mounted to the second phasing plug and includes a hollow conduit formed therein defining a circular exit of the dual compression driver. Acoustic signals from the first and second pluralities of apertures merge and radiate through the hollow conduit to the circular exit.

19 Claims, 8 Drawing Sheets

(51) Int. Cl.
*H04R 9/02* (2006.01)
*H04R 9/06* (2006.01)

(52) U.S. Cl.
CPC ...... *H04R 2201/34* (2013.01); *H04R 2400/11* (2013.01); *H04R 2400/13* (2013.01)

(56) References Cited

U.S. PATENT DOCUMENTS

| | | | | |
|---|---|---|---|---|
| 9,693,148 | B1 * | 6/2017 | Lopez | G10K 11/02 |
| 10,531,200 | B2 | 1/2020 | Voishvillo | |
| 2009/0310809 | A1 * | 12/2009 | Voishvillo | H04R 1/345<br>381/343 |
| 2011/0085692 | A1 * | 4/2011 | Voishvillo | H04R 1/345<br>381/343 |
| 2013/0243232 | A1 * | 9/2013 | Dimitrov | H04R 1/323<br>381/340 |
| 2018/0255399 | A1 * | 9/2018 | Voishvillo | H04R 1/28 |
| 2019/0208313 | A1 * | 7/2019 | Voishvillo | H04R 1/30 |
| 2023/0370781 | A1 | 11/2023 | Park et al. | |
| 2023/0403499 | A1 * | 12/2023 | Voishvillo | H04R 7/127 |

* cited by examiner

DUAL COMPRESSION DRIVER WITH SINGLE MAGNET

TECHNICAL FIELD

Embodiments relate to a dual compression driver with a single, shared magnet.

BACKGROUND

Dual compression drivers include two annular diaphragms, where the diaphragms either have the same profile and work in the same frequency range or have different profiles and radiate in different frequency bands. In addition to the two diaphragms, a dual compression driver includes two motor assemblies and two phasing plugs. The phasing plugs are positioned adjacent to each other and the diaphragms radiate through two acoustic chambers that have a mutual acoustic load (waveguide or horn). Accordingly, the time delay between two exits from the adjacent phasing plugs is very small (less than a quarter wavelength at the highest frequency) and therefore it does not create interference nor a combing effect in the audio frequency range.

Comparing a dual compression driver with a regular driver having a dome diaphragm and the same diameter of the voice coil, the moving mass of each diaphragm in the dual compression driver is lower because the mass is split between the two diaphragms. Advantageously, a lower moving mass extends the high-frequency range of the dual compression driver. Having two voice coils instead of one decreases the thermal compression and increases the dynamic range and the maximum SPL (sound pressure level), because the same level of the output acoustic signal is reached at a smaller displacement of each voice coil and each diaphragm. For the same reason, the distortion at low frequencies is smaller as well in dual compression drivers compared with regular drivers. However, the disadvantage of the dual compression driver is its high cost because of the necessity to use two motor assemblies with two expensive neodymium magnets.

SUMMARY

In one or more embodiments, a dual compression driver includes a first driver assembly including a first annular diaphragm disposed about a central axis, and a first phasing plug disposed coaxially below the first annular diaphragm and including a first plurality of apertures extending therethrough. The dual compression driver further includes a second driver assembly including a second annular diaphragm disposed about the central axis, and a second phasing plug disposed coaxially above the second annular diaphragm and including a second plurality of apertures extending therethrough. A shared annular magnet is disposed between the first driver assembly and the second driver assembly. A back cover is mounted to the first phasing plug, wherein the back cover and the first phasing plug form a first acoustic pathway for acoustic signals from the first plurality of apertures. A front adapter is mounted to the second phasing plug and has a hollow conduit formed therein along the central axis defining a circular exit of the dual compression driver, wherein the front adapter and the second phasing plug form a second acoustic pathway for acoustic signals from the second plurality of apertures. Acoustic signals from the first plurality of apertures and acoustic signals from the second plurality of apertures merge and radiate through the hollow conduit to the circular exit.

In one or more embodiments, the first driver assembly includes a first top plate disposed coaxially above the first annular diaphragm, and the second driver assembly includes a second top plate disposed coaxially below the second annular diaphragm, the shared annular magnet disposed between the first top plate and the second top plate. In one or more embodiments, the first phasing plug has a first inner edge and the second phasing plug has a second inner edge, wherein the first inner edge and the second inner edge are adjacent to each other such that the first acoustic pathway and the second acoustic pathway converge. In one or more embodiments, an output side of the first phasing plug oriented away from the first annular diaphragm includes a first plurality of radial channels extending inwardly from the first plurality of apertures to the first inner edge, and an output side of the second phasing plug oriented away from the second annular diaphragm includes a second plurality of radial channels extending inwardly from the second plurality of apertures to the second inner edge.

In one or more embodiments, the first phasing plug and the second phasing plug each have an outer portion and an inner portion joined by an intermediate portion, wherein each outer portion is generally planar, wherein each intermediate portion has an inclined section and a flat section, and wherein each inner portion is generally sloped and terminates in the first inner edge of the first phasing plug and terminates in the second inner edge of the second phasing plug. In one or more embodiments, the inner portion of the first phasing plug extends through the first annular diaphragm and the inner portion of the second phasing plug extends through the second annular diaphragm. In one or more embodiments, the first plurality of apertures are formed in the intermediate portion of the first phasing plug, and the second plurality of apertures are formed in the intermediate portion of the second phasing plug.

In one or more embodiments, the first annular diaphragm and the second annular diaphragm each have an external portion and an internal portion joined by a middle portion, wherein each external portion and each internal portion are generally planar and each first middle portion is generally sloped such that a plane of each internal portion is offset from a plane of each external portion. In one or more embodiments, the middle portion of the first annular diaphragm is aligned with the inclined section of the first phasing plug, and the middle portion of the second annular diaphragm is aligned with the inclined section of the second phasing plug. In one or more embodiments, each middle portion includes a step section configured for attaching a first voice coil to the first annular diaphragm and a second voice coil to the second annular diaphragm.

In one or more embodiments, the first plurality of apertures and the second plurality of apertures are each arranged generally circumferentially about the central axis. In one or more embodiments, the back cover has a peripheral portion and a central portion, the central portion including a hub portion extending at least partially into the hollow conduit. In one or more embodiments, a first compression chamber is defined between an input side of the first phasing plug and the first annular diaphragm, and a second compression chamber is defined between an input side of the second phasing plug and the second annular diaphragm, the first plurality of apertures forming an exit to the first compression chamber and the second plurality of apertures forming an exit to the second compression chamber.

In one or more embodiments, a dual compression driver includes a first driver assembly including a first annular diaphragm disposed about a central axis, a first phasing plug disposed coaxially below the first annular diaphragm and having a first inner edge, and a first top plate disposed coaxially above the first annular diaphragm, the first phasing plug including a first plurality of apertures extending therethrough. The dual compression driver further includes a second driver assembly including a second annular diaphragm disposed about the central axis, a second phasing plug disposed coaxially above the second annular diaphragm and having a second inner edge, and a second top plate disposed coaxially below the second annular diaphragm, the second phasing plug including a second plurality of apertures extending therethrough. A shared annular magnet is disposed between the first top plate and the second top plate. A back cover is mounted to the first phasing plug, wherein the back cover and the first phasing plug form a first acoustic pathway for acoustic signals from the first plurality of apertures. A front adapter is mounted to the second phasing plug and has a hollow conduit formed therein along the central axis and defining a circular exit of the dual compression driver, wherein the front adapter and the second phasing plug form a second acoustic pathway for acoustic signals from the second plurality of apertures. The first inner edge and the second inner edge are adjacent to each other such that the first acoustic pathway and the second acoustic pathway converge at a central bore of the dual compression driver, such that acoustic signals from the first plurality of apertures and acoustic signals from the second plurality of apertures radiate inward toward the central bore then merge and radiate through the hollow conduit to the circular exit.

In one or more embodiments, a dual compression driver includes a first driver assembly including a first annular diaphragm disposed about a central axis, and a first phasing plug disposed coaxially below the first annular diaphragm, the first phasing plug including an input side oriented toward the first annular diaphragm and an output side oriented away from the first annular diaphragm, the first phasing plug including a first plurality of apertures extending therethrough. The dual compression includes a second driver assembly including a second annular diaphragm disposed about the central axis, and a second phasing plug disposed coaxially above the second annular diaphragm, the second phasing plug including an input side oriented toward the second annular diaphragm and an output side oriented away from the second annular diaphragm, the second phasing plug including a second plurality of apertures extending therethrough. A shared annular magnet is disposed between the first driver assembly and the second driver assembly. A back cover is mounted to the first phasing plug, wherein an inner surface of the back cover and the output side of the first phasing plug form a first acoustic pathway for acoustic signals from the first plurality of apertures. A front adapter is mounted to the second phasing plug and having a hollow conduit formed therein along the central axis, the hollow conduit having a bottom end adjacent to the second phasing plug and a top end defining a circular exit of the dual compression driver, wherein an inner surface of the front adapter and the output side of the second phasing plug form a second acoustic pathway for acoustic signals from the second plurality of apertures. Acoustic signals from the first plurality of apertures and acoustic signals from the second plurality of apertures merge and radiate through the hollow conduit to the circular exit.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is understood that directional identifiers such as, but not limited to, top, bottom, above, below, upper, lower, upwardly and downwardly used herein for descriptive purposes are not intended to be limiting, and are simply used to provide an exemplary environment for the components of the dual compression driver as disclosed herein. Any directional terms as used herein are merely to indicate the relative placement of various components of the dual compression driver and are not intended to limit components to any particular orientation in space.

According to one or more embodiments, a dual compression driver is disclosed herein that uses a single magnet shared between two driver assemblies. This design is scalable and helps to significantly decrease the cost of the dual compression driver by only requiring one magnet. In the single magnet configuration as disclosed herein, the phasing plugs and their corresponding diaphragms are not positioned against each other as they would be in a typical dual driver, such that the diaphragms become separated not only by the thicknesses of the phasing plugs, but by the thickness of the shared magnet and the two top plates as well. In order to prevent a delay between the phasing plug exits as well as to prevent the generation of any unwanted combing effect at high frequencies, embodiments of the dual compression driver disclosed herein minimize this time delay via a specialized configuration of the diaphragms and the phasing plugs as described below.

Figure 1:
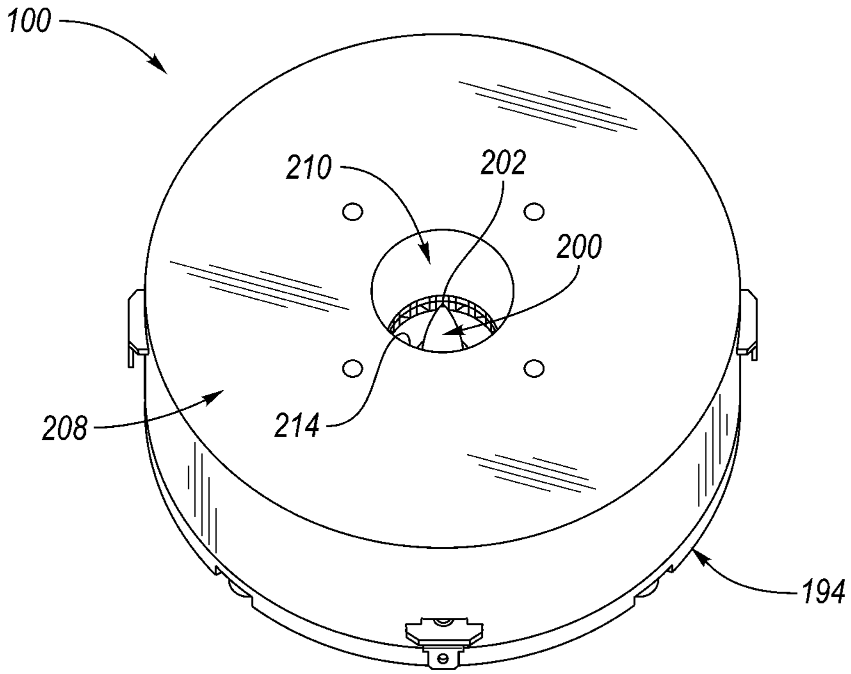
FIG. 1 is a top perspective view of the dual compression driver according to one or more embodiments.
Figure 2:
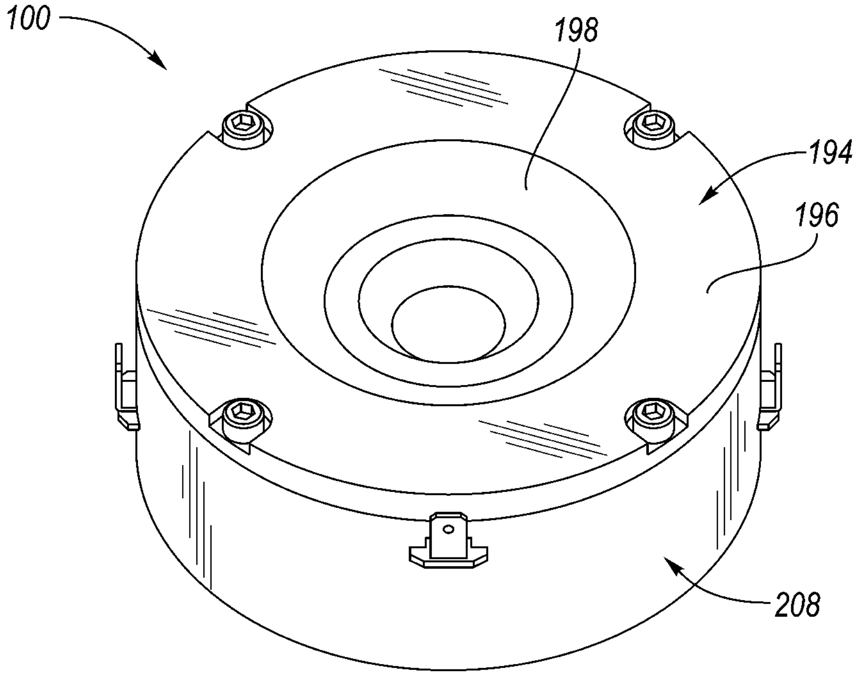
FIG. 2 is a bottom perspective view of the dual compression driver according to one or more embodiments.
Figure 3:
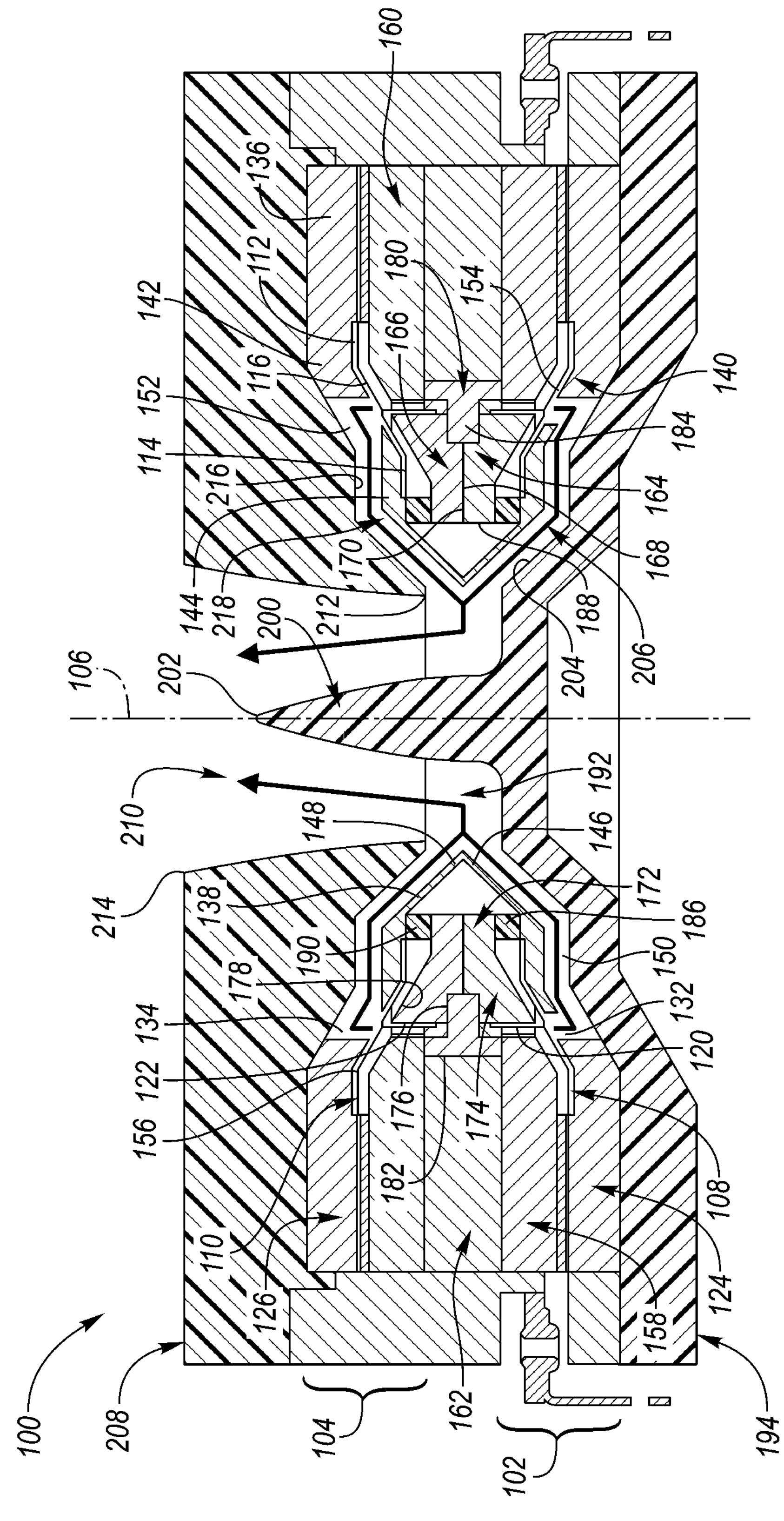
FIG. 3 is a cross-sectional view of the dual compression driver according to one or more embodiments.
Figure 4:
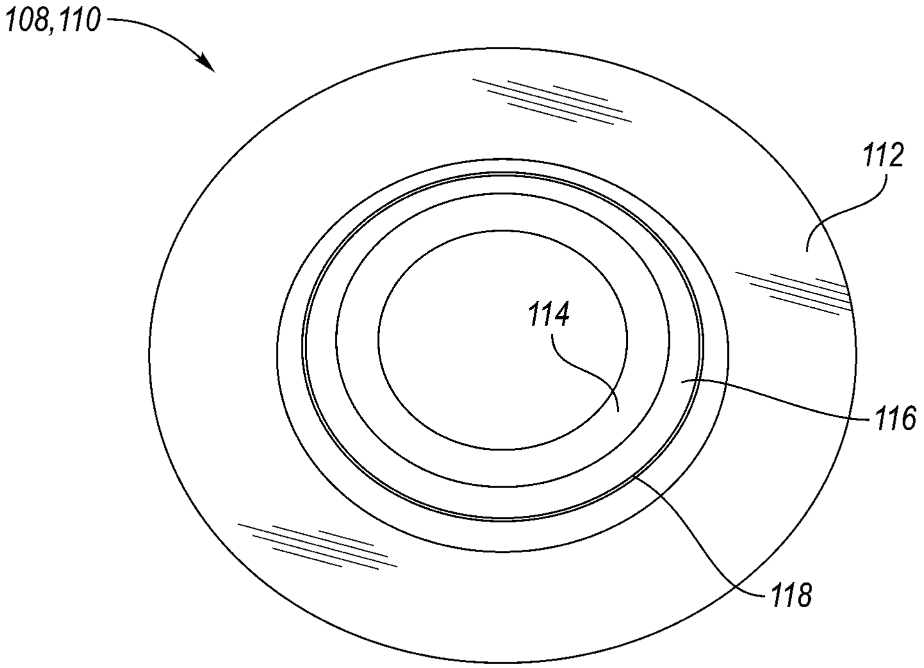
FIG. 4 is a bottom perspective view of a first annular diaphragm or top perspective view of a second annular diaphragm according to one or more embodiments.

With reference first to FIGS. 1-3, a dual compression driver 100 is disclosed herein including a first or rear driver assembly 102 and a second or front driver assembly 104 which may be utilized in a transducer or loudspeaker. The first driver assembly 102 and the second driver assembly 104 may be configured to operate in the same frequency range or in different frequency ranges. The various components of the dual compression driver 100 may be disposed generally about a central axis 106.

As shown in the cross-sectional view of FIG. 3, the first driver assembly 102 includes a first annular diaphragm 108 disposed about the central axis 106, and the second driver assembly 104 includes a second annular diaphragm 110 disposed about the central axis 106. In one or more embodiments, the first annular diaphragm 108 and the second annular diaphragm 110 may be constructed from a polymer film. The first annular diaphragm 108 and the second annular diaphragm 110 are identical, but disposed with opposing orientations. As shown in FIGS. 3-5 and 10, the first annular diaphragm 108 and the second annular diaphragm 110 each have an external portion 112 and an internal portion 114 joined by a middle portion 116. In one or more embodiments, the middle portion 116 may include a coating to increase its stiffness or it may be constructed from a stiffer material compared with the external portion 112 and the internal portion 114, such that the external portion 112 and the internal portion 114 may act as flexible suspensions. Conventional annular diaphragms may include a V-shaped section between inner and outer, co-planar clamping portions. In contrast, according to one or more embodiments of the dual compression driver 100 disclosed herein, the external portion 112 and the internal portion 114 are each generally planar, and the middle portion 116 is generally sloped such that a plane of the internal portion 114 is offset from a plane of the external portion 112.

Figure 5:
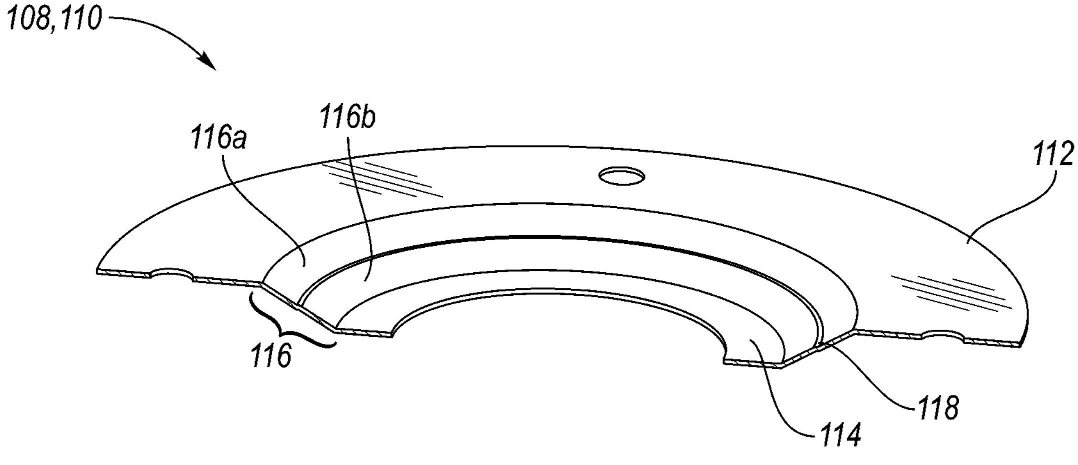
FIG. 5 is a cross-sectional view of the first or second annular diaphragm.
Figure 6:
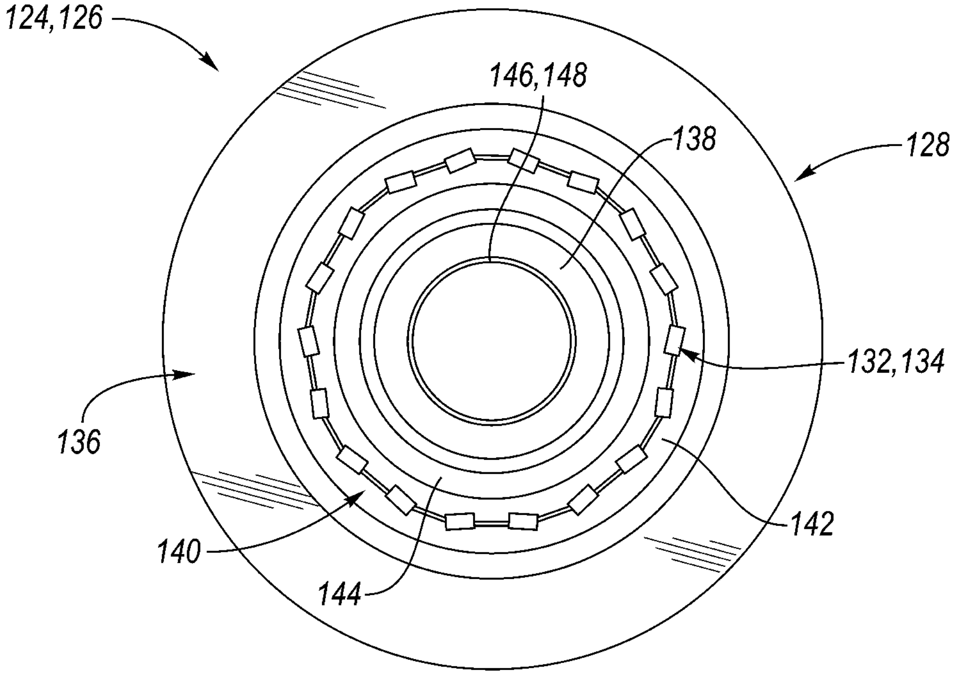
FIG. 6 is a bottom view of a first phasing plug or a top view of a second phasing plug according to one or more embodiments.
Figure 7:
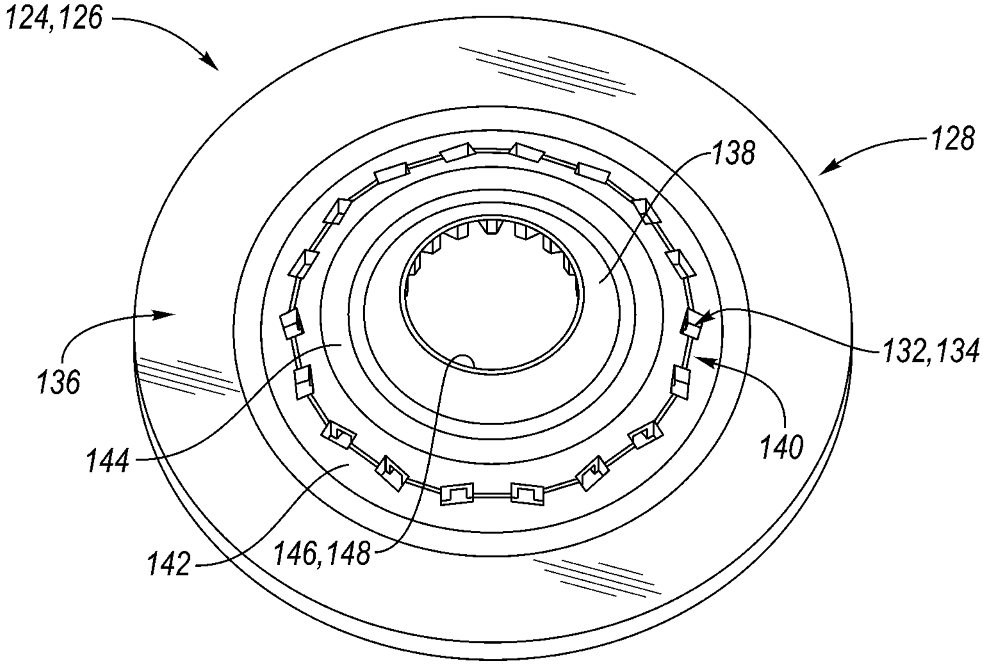
FIG. 7 is a bottom perspective view of the first phasing plug or a top perspective view of the second phasing plug.
Figure 8:
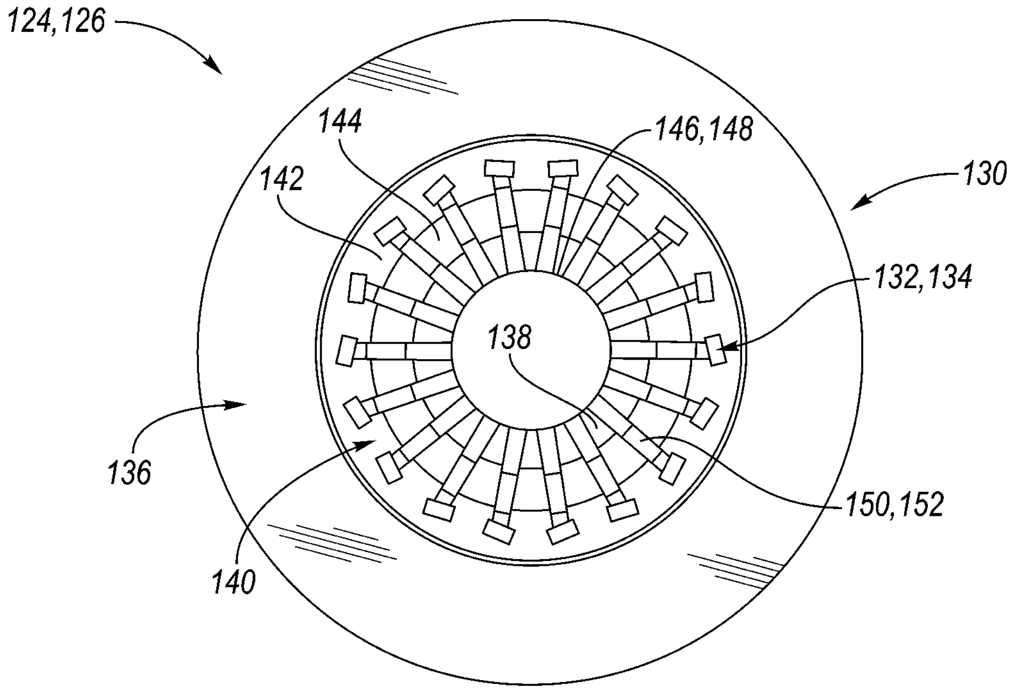
FIG. 8 is a top view of the first phasing plug or a bottom view of the second phasing plug.
Figure 9:
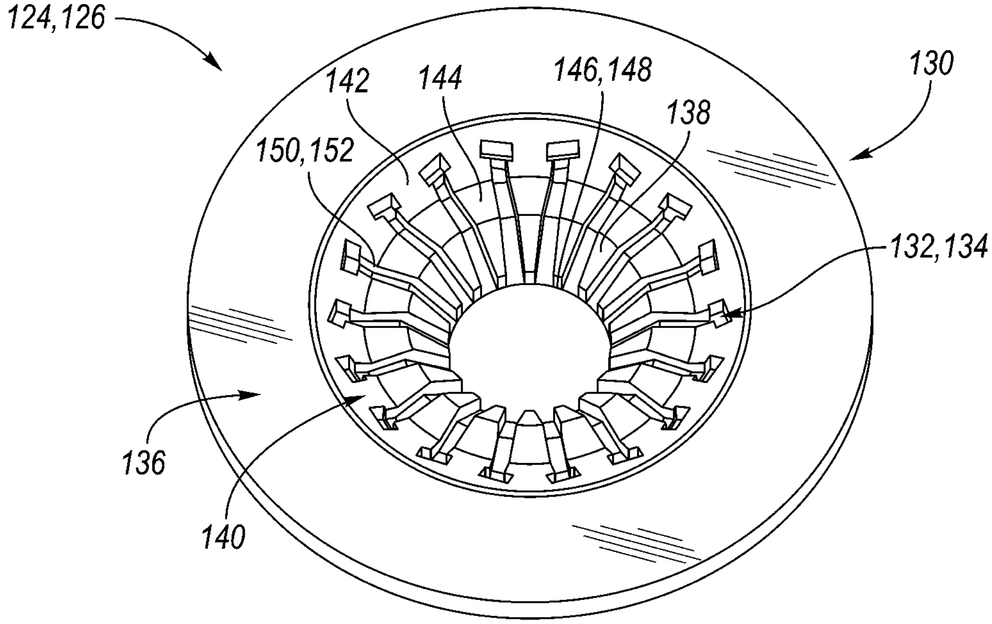
FIG. 9 is a top perspective view of the first phasing plug or a bottom perspective view of the second phasing plug.

In one or more embodiments, the middle portion 116 includes a step section 118 configured for attaching a first voice coil 120 to the first annular diaphragm 108 and a second voice coil 122 to the second annular diaphragm 110 (FIG. 3). With reference to FIG. 5, while each segment 116*a* and 116*b* of the middle portion 116 (on either side of the step section 118) is depicted herein as having the same angle with respect to the external portion 112 and the internal portion 114 and with respect to each other, these segments 116*a*, 116*b* instead may have different angles with respect to the external portion 112 and the internal portion 114 and with respect to each other. In the latter instance, the step section 118 may be biased inward such that an internal angle between the segments 116*a*, 116*b* is obtuse, or the step section 118 may be biased outward such that the internal angle between the segments 116*a*, 116*b* is acute. Either of these configurations may provide added flexibility in controlling the mechanical behavior of the first annular diaphragm 108 and the second annular diaphragm 110.

Turning now to FIGS. 3 and 6-10, the first driver assembly 102 includes a first phasing plug 124 is disposed coaxially below the first annular diaphragm 108, and the second driver assembly 104 includes a second phasing plug 126 disposed coaxially above the second annular diaphragm 110. The first phasing plug 124 and the second phasing plug 126 are identical, but disposed with opposite orientations. The first phasing plug 124 and includes an input side 128 oriented toward the first annular diaphragm 108 and an output side 130 oriented away from the first annular diaphragm 108. Correspondingly, the second phasing plug 126 includes an input side 128 oriented toward the second annular diaphragm 110 and an output side 130 oriented away from the second annular diaphragm 110. The first phasing plug 124 includes a first plurality of apertures 132 extending therethrough from the input side 128 to the output side 130, and the second phasing plug 126 includes a second plurality of apertures 134 extending therethrough from the input side 128 to the output side 130.

The first phasing plug 124 and the second phasing plug 126 may be configured to correspond to the shape of the first annular diaphragm 108 and second annular diaphragm 110, respectively. The first phasing plug 124 and the second phasing plug 126 each have an outer portion 136 and an inner portion 138 joined by an intermediate portion 140. In one or more embodiments, each outer portion 136 may be generally planar and lie in a plane orthogonal to the central axis 106. Each intermediate portion 140 has an inclined section 142 and a flat section 144. The inner portion 138 of the first phasing plug 124 is generally sloped and terminates in a first inner edge 146 and the inner portion 138 of the second phasing plug 126 is generally sloped and terminates in a second inner edge 148. The output side 130 of the first phasing plug 124 includes a first plurality of radial channels 150 extending inwardly from the first plurality of apertures 132 to the first inner edge 146, and the output side 130 of the second phasing plug 126 includes a second plurality of radial channels 152 extending inwardly from the second plurality of apertures 134 to the second inner edge 148. Each of the first and second pluralities of apertures 132, 134 is therefore acoustically connected to a corresponding one of the first and second pluralities of radial channels 150, 152. In one or more embodiments, the first plurality of apertures 132 are formed in the intermediate portion 140 of the first phasing plug 124, and the second plurality of apertures 134 are formed in the intermediate portion 140 of the second phasing plug 126.

In a compression driver, the diaphragm is loaded by a compression chamber, which is a thin layer of air separating the diaphragm from the phasing plug. In the embodiments disclosed herein, and with reference to FIG. 3, a first compression chamber 154 is defined between the input side 128 of the first phasing plug 124 and the first annular diaphragm 108, where the first plurality of apertures 132 form an exit to the first compression chamber 154. A second compression chamber 156 is defined between the input side 128 of the second phasing plug 126 and the second annular diaphragm 110, where the second plurality of apertures 134 form an exit to the second compression chamber 156. The volume of air entrapped in the compression chamber is characterized by an acoustical compliance which is proportional to the volume of compression chamber. In practice, the height of the compression chamber may be quite small (e.g., approximately 0.5 mm or less) such that the volume of the compression chamber is also small. The small radial dimension of the first annular diaphragm 108 and the second annular diaphragm 110 corresponds to the small radial dimensions of the matching compression chamber 154, 156, which shifts undesirable air resonances (cross-modes) in the compression chamber 154, 156 to higher frequencies, sometimes above the audio range.

The first phasing plug 124 and the second phasing plug 126 are directed radially towards each other at an angle. In one or more embodiments, the middle portion 116 of the first annular diaphragm 108 is aligned with the inclined section

Figure 10:
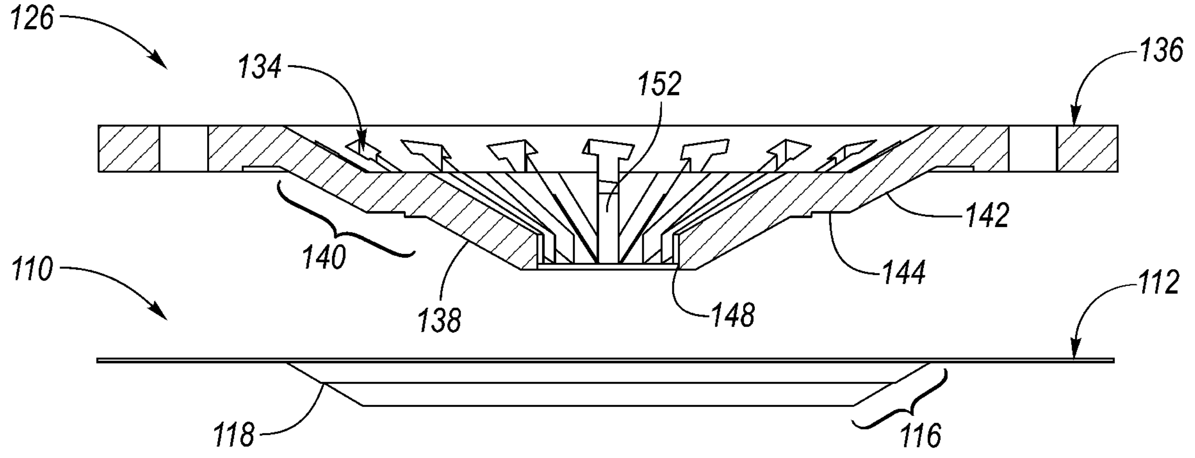
FIG. 10 is a cross-sectional, exploded view illustrating the second phasing plug and the second annular diaphragm according to one or more embodiments.
Figure 11:
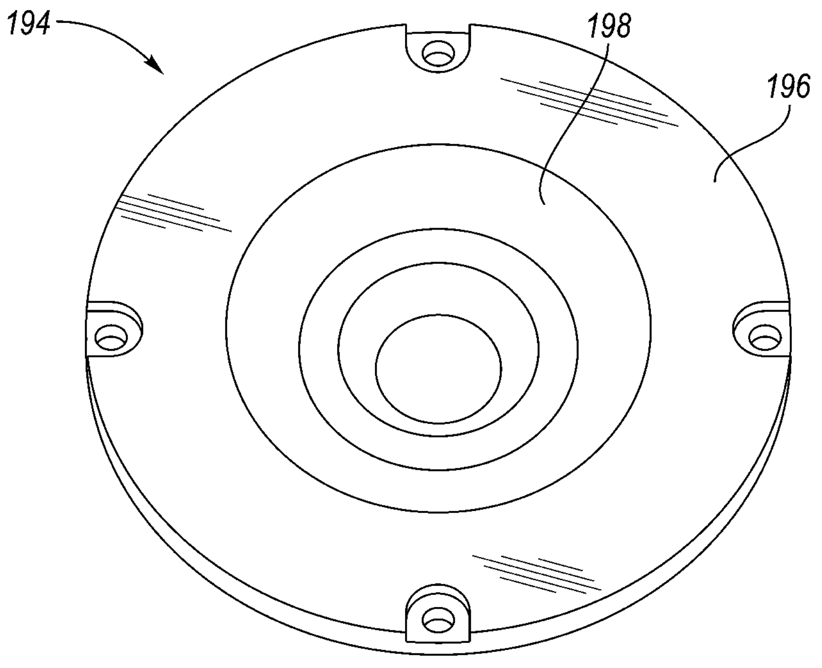
FIG. 11 is a bottom perspective view of the back cover according to one or more embodiments.
Figure 12:
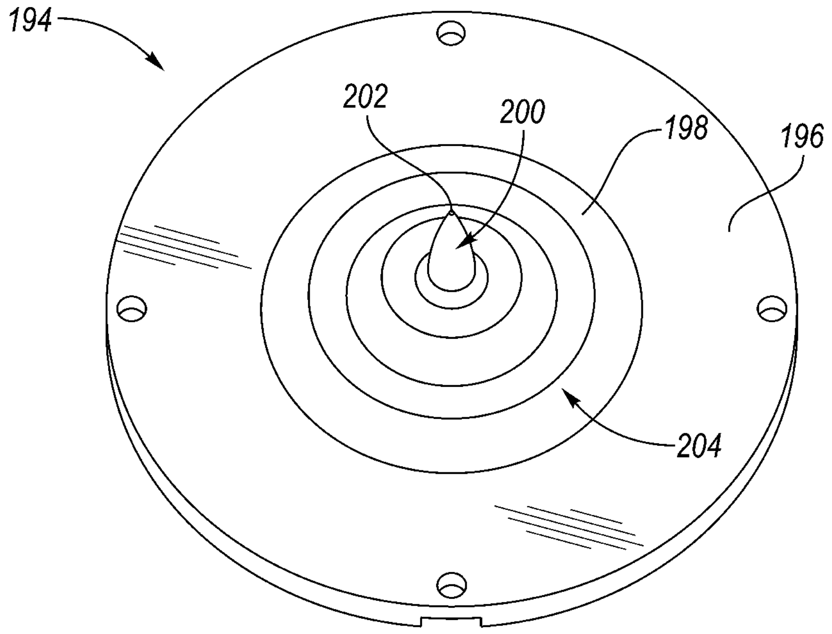
FIG. 12 is a top perspective view of the back cover according to one or more embodiments.
Figure 13:
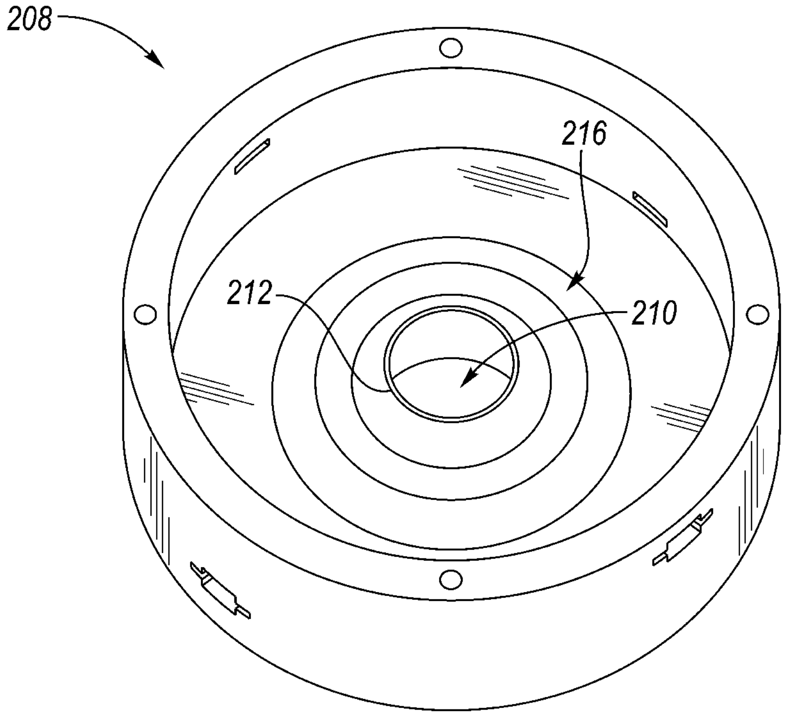
FIG. 13 is a bottom perspective view of a front adapter according to one or more embodiments.

142 of the first phasing plug 124, and the middle portion 116 of the second annular diaphragm 110 is aligned with the inclined section 142 of the second phasing plug 126. As best shown in FIGS. 3 and 10, the inner portion 138 of the first phasing plug 124 is configured to extend through the first annular diaphragm 108, and the inner portion 138 of the second phasing plug 126 is configured to extend through the second annular diaphragm 110. The configuration of the first and second annular diaphragms 108, 110 and the first and second phasing plugs 124, 126 contributes to minimizing the distance between the radial exits of the first and second phasing plugs 124, 126 (the first and second pluralities of radial channels 150, 152) at the first inner edge 146 and the second inner edge 148, such that the radial exits of the first and second phasing plugs 124, 126 converge with a minimum axial distance between them.

With reference to FIG. 3, the first driver assembly 102 includes a first annular top plate 158 disposed coaxially above the first annular diaphragm 108, and the second driver assembly 104 includes a second annular top plate 160 disposed coaxially below the second annular diaphragm 110. In one or more embodiments, the dual compression driver 100 includes a single, shared annular permanent magnet 162 disposed between the first driver assembly 102 and the second driver assembly 104, such as between the first top plate 158 and the second top plate 160. The shared magnet 162 provides a permanent magnetic field for electrodynamic coupling with the first voice coil 120 which produces movement of the flexible, middle portion 116 of the first annular diaphragm 108 to convert received electrical signals into acoustic signals (sound waves). The shared magnet 162 also provides a permanent magnetic field for electrodynamic coupling with the second voice coil 122 which produces movement of the flexible, middle portion 116 of the second annular diaphragm 110 to convert received electrical signals into acoustic signals.

Acoustic signals created by the first annular diaphragm 108 travel through the first plurality of apertures 132 which serve as an entrance to the first phasing plug 124, and acoustic signals created by the second annular diaphragm 110 travel through the second plurality of apertures 134 which serve as an entrance to the second phasing plug 126. Accordingly, the area of the entrance to the first phasing plug 124 and to the second phasing plug 126 is significantly smaller than the area of the first annular diaphragm 108 and the second annular diaphragm 110, respectively. As illustrated in FIGS. 6-10, the first plurality of apertures 132 and the second plurality of apertures 134 may each be arranged generally circumferentially about the central axis 106, generally forming a circle. In one or more embodiments, the first plurality of apertures 132 and the second plurality of apertures 134 each have a "zig-zag" or sawtooth type configuration arranged generally circumferentially about the central axis 106 as shown. Such a meandering configuration of the apertures 132, 134 helps to mitigate any adverse influence of diaphragm breakups on frequency response, and may have the effect of smearing the air resonances in the first and second compression chambers 154, 156 so as to shape and improve the wavefront exiting the dual compression driver 100. However, the first plurality of apertures 132 and the second plurality of apertures 134 are not limited to the embodiments depicted herein and may include other suitable shapes and configurations.

Figure 14:
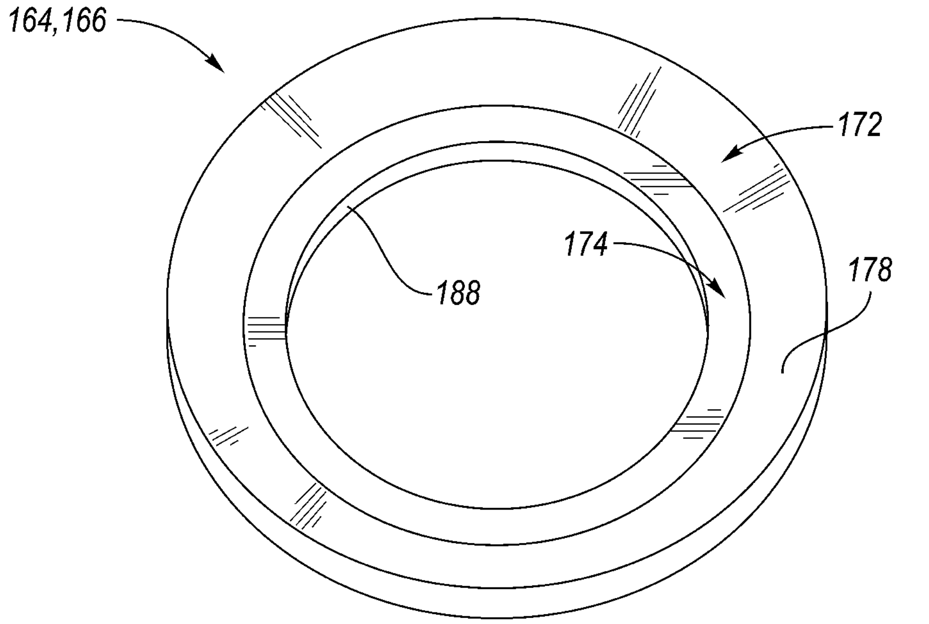
FIG. 14 is a perspective view of a first or second pole piece according to one or more embodiments.

With reference to FIGS. 3 and 14, the first driver assembly 102 may also include a first annular pole piece 164 disposed coaxially above the first annular diaphragm 108 and inset from the first top plate 158. Likewise, the second driver assembly 104 may also include a second annular pole piece 166 disposed coaxially below the second annular diaphragm 110 and inset from the second top plate 160. As shown in FIG. 3, a top surface 168 of the first pole piece 164 abuts a bottom surface 170 of the second pole piece 166. The first pole piece 164 and the second pole piece 166 may each include an outboard portion 172 having a greater thickness than an inboard portion 174 thereof, wherein the outboard portion 172 has a recessed surface 176 and an inclined surface 178. The inclined surface 178 of the first pole piece 164 may be oriented toward the middle portion 116 of the first annular diaphragm 108, and the inclined surface 178 of the second pole piece 166 may be oriented toward the middle portion 116 of the second annular diaphragm 110.

Figure 15:
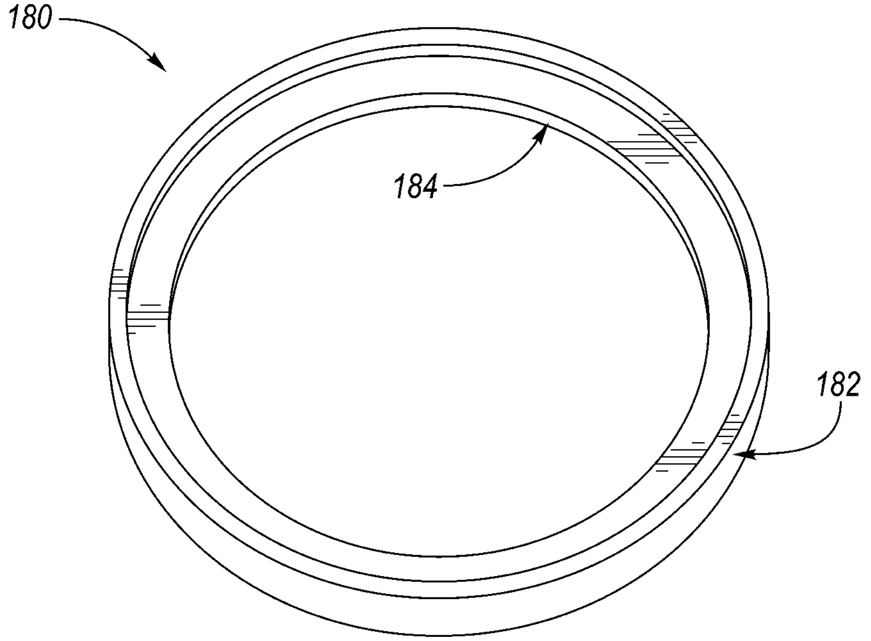
FIG. 15 is a perspective view of an insert ring according to one or more embodiments.

As shown in FIGS. 3 and 15, the dual compression driver 100 may further include an insert ring 180 having an outer face 182 configured to abut the shared magnet 162, and an inner projection 184 configured to be disposed between the first pole piece 164 and the second pole piece 166 and received within each corresponding recessed surface 176. A first glue ring 186 may be disposed coaxially below an inner edge 188 of the first pole piece 164, and a second glue ring 190 may be disposed coaxially above an inner edge 188 of the second pole piece 166. The first glue ring 186 may secure and/or clamp the external portion 112 of the first annular diaphragm 108 to the first pole piece 164 and the first phasing plug 124, and the second glue ring 190 may secure and/or clamp the external portion 112 of the second annular diaphragm 110 to the second pole piece 166 and the second phasing plug 126. In general, components of the first driver assembly 102 and the second driver assembly 104 may be connected together by fasteners or adhesives. A central bore 192 coaxial with the central axis 106 is defined by the annular components of the dual compression driver 100.

As illustrated in FIGS. 1-3 and 11-12, a back cover 194 is mounted to the first phasing plug 124 and has a peripheral portion 196 and a central portion 198, wherein a plane of the central portion 198 may offset (e.g. upward) from a plane of the peripheral portion 196. In one or more embodiments, the central portion 198 may include a hub portion 200 extending into the central bore 192, wherein the hub portion 200 may have an elongated, generally bullet-shaped profile. That is, a diameter of the hub portion 200 is less than an inside diameter of the central bore 192, and may taper in the axial direction to a sharp or domed tip 202 located on the central axis 106. As best shown in FIG. 3, an inner surface 204 of the back cover 194 and the output side 130 of the first phasing plug 124 form a first acoustic pathway 206 for acoustic signals from the first plurality of apertures 132 and the first driver assembly 102.

With reference to FIGS. 1-3 and 13, in one or more embodiments a front adapter 208 is mounted to the second phasing plug 126 and includes a hollow conduit 210 formed therein along the central axis 106, wherein the hollow conduit 210 may be considered as an extension of the central bore 192. In one or more embodiments, the hub portion 200 may extend at least partially through the hollow conduit 210, and may extend to an axial elevation above the second phasing plug 126. The hollow conduit 210 has a bottom end 212 adjacent to the second phasing plug 126 and a top end which defines a circular exit 214 of the dual compression driver 100. A diameter of the top end or circular exit 214 may be greater than a diameter of the bottom end 212, such that hollow conduit 210 tapers outwardly from the bottom end 212 to the circular exit 214, wherein the diameter of the bottom end 212 may be substantially the same as a diameter of the central bore 192. The front adapter 208 has an inner surface 216 disposed on or attached to the second driver assembly 104, such as the outer portion 136 of the second phasing plug 126. As shown in FIGS. 1-3, the front adapter 208 may substantially surround the second driver assembly 104 and the shared magnet 162, and possibly the first driver assembly 102 as well. As best shown in FIG. 3, the inner surface 216 of the front adapter 208 and the output side 130 of the second phasing plug 126 together form a second acoustic pathway 218 for acoustic signals from the second plurality of apertures 134 and the second driver assembly 104.

In one or more embodiments, and as best illustrated in FIG. 3, the first inner edge 146 of the first phasing plug 124 and the second inner edge 148 of the second phasing plug 126 are adjacent to each other such that the first acoustic pathway 206 and the second acoustic pathway 218 converge, such as at the central bore 192. Accordingly, in operation, acoustic signals from the first plurality of apertures 132 radiate inward along the first acoustic pathway 206 and acoustic signals from the second plurality of apertures 134 radiate inward along the second acoustic pathway 218 and merge at the central bore 192, then radiate through the hollow conduit 210 of the front adapter 208 to the circular exit 214 of the dual compression driver 100. The overall acoustical cross-sectional area of the air paths, including the first and second plurality of apertures 132, 134, the first and second plurality of radial channels 150, 152, the first and second acoustic pathways 206, 218, the central bore 192, and the hollow conduit 210 gradually increase to provide a smooth transition of acoustic signals through the dual compression driver 100. The disclosed configuration of the first and second annular diaphragms 108, 110 and the first and second phasing plugs 124, 126 decrease the path length between the radial exits of the first and second phasing plugs 124, 126 to allow smooth merging of acoustic signals, and the use of a shared magnet 162 between the first driver assembly 102 and the second driver assembly 104 significantly decreases cost without sacrificing performance of the dual compression driver 100.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A dual compression driver, comprising:

a first driver assembly including a first annular diaphragm disposed about a central axis, and a first phasing plug disposed coaxially below the first annular diaphragm and including a first plurality of apertures extending therethrough;

a second driver assembly including a second annular diaphragm disposed about the central axis, and a second phasing plug disposed coaxially above the second annular diaphragm and including a second plurality of apertures extending therethrough;

a shared annular magnet disposed between the first driver assembly and the second driver assembly;

a back cover mounted to the first phasing plug, wherein the back cover and the first phasing plug form a first acoustic pathway for acoustic signals from the first plurality of apertures; and a front adapter mounted to the second phasing plug and having a hollow conduit formed therein along the central axis defining a circular exit of the dual compression driver, wherein the front adapter and the second phasing plug form a second acoustic pathway for acoustic signals from the second plurality of apertures, wherein the first annular diaphragm and the second annular diaphragm each have an external portion and an internal portion joined by a middle portion, wherein each external portion is generally planar, each internal portion is generally planar, and each middle portion is generally sloped such that a plane of each internal portion is not coplanar with a plane of each external portion, wherein acoustic signals from the first plurality of apertures and acoustic signals from the second plurality of apertures merge and radiate through the hollow conduit to the circular exit.

2. The dual compression driver of claim 1, wherein the first driver assembly includes a first top plate disposed coaxially above the first annular diaphragm, and the second driver assembly includes a second top plate disposed coaxially below the second annular diaphragm, the shared annular magnet disposed between the first top plate and the second top plate.

3. The dual compression driver of claim 1, wherein the first phasing plug has a first inner edge and the second phasing plug has a second inner edge, wherein the first inner edge and the second inner edge are adjacent to each other such that the first acoustic pathway and the second acoustic pathway converge.

4. The dual compression driver of claim 3, wherein an output side of the first phasing plug oriented away from the first annular diaphragm includes a first plurality of radial channels extending inwardly from the first plurality of apertures to the first inner edge, and an output side of the second phasing plug oriented away from the second annular diaphragm includes a second plurality of radial channels extending inwardly from the second plurality of apertures to the second inner edge.

5. The dual compression driver of claim 3, wherein the first phasing plug and the second phasing plug each have an outer portion and an inner portion joined by an intermediate portion, wherein each outer portion is generally planar, wherein each intermediate portion has an inclined section and a flat section, and wherein each inner portion is generally sloped and terminates in the first inner edge of the first phasing plug and the second inner edge of the second phasing plug.

6. The dual compression driver of claim 5, wherein the inner portion of the first phasing plug extends through the first annular diaphragm and the inner portion of the second phasing plug extends through the second annular diaphragm.

7. The dual compression driver of claim 5, wherein the first plurality of apertures are formed in the intermediate portion of the first phasing plug, and wherein the second plurality of apertures are formed in the intermediate portion of the second phasing plug.

8. The dual compression driver of claim 5, wherein the middle portion of the first annular diaphragm is aligned with the inclined section of the first phasing plug, and wherein the middle portion of the second annular diaphragm is aligned with the inclined section of the second phasing plug.

9. The dual compression driver of claim 1, wherein each middle portion includes a step section configured for attaching a first voice coil to the first annular diaphragm and a second voice coil to the second annular diaphragm.

10. The dual compression driver of claim 1, wherein the first plurality of apertures and the second plurality of apertures are each arranged generally circumferentially about the central axis.

11. The dual compression driver of claim 1, wherein the back cover has a peripheral portion and a central portion, the central portion including a hub portion extending at least partially into the hollow conduit.

12. The dual compression driver of claim 1, wherein a first compression chamber is defined between an input side of the first phasing plug and the first annular diaphragm, and a second compression chamber is defined between an input side of the second phasing plug and the second annular diaphragm, the first plurality of apertures forming an exit to the first compression chamber and the second plurality of apertures forming an exit to the second compression chamber.

13. A dual compression driver, comprising:

a first driver assembly including a first annular diaphragm disposed about a central axis, a first phasing plug disposed coaxially below the first annular diaphragm and having a first inner edge, and a first top plate disposed coaxially above the first annular diaphragm, the first phasing plug including a first plurality of apertures extending therethrough;

a second driver assembly including a second annular diaphragm disposed about the central axis, a second phasing plug disposed coaxially above the second annular diaphragm and having a second inner edge, and a second top plate disposed coaxially below the second annular diaphragm, the second phasing plug including a second plurality of apertures extending therethrough;

a shared annular magnet disposed between the first top plate and the second top plate;

a back cover mounted to the first phasing plug, wherein the back cover and the first phasing plug form a first acoustic pathway for acoustic signals from the first plurality of apertures; and a front adapter mounted to the second phasing plug and having a hollow conduit formed therein along the central axis and defining a circular exit of the dual compression driver, wherein the front adapter and the second phasing plug form a second acoustic pathway for acoustic signals from the second plurality of apertures, wherein the first inner edge and the second inner edge are adjacent to each other such that the first acoustic pathway and the second acoustic pathway converge at a central bore of the dual compression driver, such that acoustic signals from the first plurality of apertures and acoustic signals from the second plurality of apertures radiate inward toward the central bore then merge and radiate through the hollow conduit to the circular exit.

14. The dual compression driver of claim 13, wherein an output side of the first phasing plug oriented away from the first annular diaphragm includes a first plurality of radial channels extending inwardly from the first plurality of apertures to the first inner edge, and an output side of the second phasing plug oriented away from the second annular diaphragm includes a second plurality of radial channels extending inwardly from the second plurality of apertures to the second inner edge.

15. The dual compression driver of claim 13, wherein the first phasing plug and the second phasing plug each have an outer portion and an inner portion joined by an intermediate portion, wherein each outer portion is generally planar, wherein each intermediate portion has an inclined section and a flat section, and wherein each inner portion is generally sloped and terminates in the first inner edge of the first phasing plug and terminates in the second inner edge of the second phasing plug.

16. The dual compression driver of claim 15, wherein the first annular diaphragm and the second annular diaphragm each have an external portion and an internal portion joined by a middle portion, wherein each external portion and each internal portion are each generally planar and each middle portion is generally sloped such that a plane of each internal portion is offset from a plane of each external portion.

17. The dual compression driver of claim 13, wherein the first plurality of apertures and the second plurality of apertures are each arranged generally circumferentially about the central axis.

18. The dual compression driver of claim 13, wherein the back cover has a peripheral portion and a central portion, the central portion including a hub portion extending at least partially into the hollow conduit.

19. A dual compression driver, comprising:

a first driver assembly including a first annular diaphragm disposed about a central axis, and a first phasing plug disposed coaxially below the first annular diaphragm, the first phasing plug including an input side oriented toward the first annular diaphragm and an output side oriented away from the first annular diaphragm, the first phasing plug including a first plurality of apertures extending therethrough, wherein the first phasing plug has an outer portion and an inner portion joined by an intermediate portion, wherein the outer portion is generally planar, the intermediate portion has an inclined section and a flat section, and the inner portion is generally sloped and terminates in a first inner edge;

a second driver assembly including a second annular diaphragm disposed about the central axis, and a second phasing plug disposed coaxially above the second annular diaphragm, the second phasing plug including an input side oriented toward the second annular diaphragm and an output side oriented away from the second annular diaphragm, the second phasing plug including a second plurality of apertures extending therethrough, wherein the second phasing plug has an outer portion and an inner portion joined by an intermediate portion, wherein the outer portion is generally planar, the intermediate portion has an inclined section and a flat section, and the inner portion is generally sloped and terminates in a second inner edge;

a shared annular magnet disposed between the first driver assembly and the second driver assembly;

a back cover mounted to the first phasing plug, wherein an inner surface of the back cover and the output side of the first phasing plug form a first acoustic pathway for acoustic signals from the first plurality of apertures; and a front adapter mounted to the second phasing plug and having a hollow conduit formed therein along the central axis, the hollow conduit having a bottom end adjacent to the second phasing plug and a top end defining a circular exit of the dual compression driver, wherein an inner surface of the front adapter and the output side of the second phasing plug form a second acoustic pathway for acoustic signals from the second plurality of apertures, wherein the first inner edge and the second inner edge are adjacent to each other such that the first acoustic pathway and the second acoustic pathway converge and acoustic signals from the first plurality of apertures and acoustic signals from the second plurality of apertures merge and radiate through the hollow conduit to the circular exit.

* * * * *